(12) United States Patent
Wang et al.

(10) Patent No.: US 10,949,197 B1
(45) Date of Patent: Mar. 16, 2021

(54) ANALYSIS OF PATCH IMPACT ON A RUNNING DATABASE APPLICATION

(71) Applicant: INTERNATIONAL BUSINESS MACHINES CORPORATION, Armonk, NY (US)

(72) Inventors: Xiaobo Wang, Beijing (CN); Shuo Li, Beijing (CN); Shengyan Sun, Beijing (CN); Xiao Xiao Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/674,509

(22) Filed: Nov. 5, 2019

(51) Int. Cl.
*G06F 8/656* (2018.01)
*G06F 16/21* (2019.01)

(52) U.S. Cl.
CPC ............ *G06F 8/656* (2018.02); *G06F 16/213* (2019.01); *G06F 16/217* (2019.01)

(58) Field of Classification Search
CPC ....... G06F 16/213; G06F 16/217; G06F 8/656
See application file for complete search history.

(56) References Cited

U.S. PATENT DOCUMENTS

| | | | |
|---|---|---|---|
| 7,895,592 B2 | 2/2011 | Subramanian | |
| 8,418,150 B2 | 4/2013 | Thirumalai | |
| 8,473,484 B2 | 6/2013 | Egan | |
| 8,893,106 B2 | 11/2014 | Ningombam | |
| 9,063,819 B2 | 6/2015 | Raju | |
| 9,141,635 B2 | 9/2015 | Buzaski | |
| 9,311,305 B2 | 4/2016 | Buzaski | |
| 9,960,963 B2 | 5/2018 | Selvaraj | |
| 10,013,248 B2 | 7/2018 | Buzsaki | |
| 10,650,028 B2 * | 5/2020 | Collins | G06F 11/3433 |
| 2007/0050678 A1 | 3/2007 | Estes | |
| 2008/0114803 A1 * | 5/2008 | Chinchwadkar | G06F 16/8365 |
| 2009/0164415 A1 * | 6/2009 | Lee | G06F 16/24534 |
| 2010/0134416 A1 | 6/2010 | Karasin | |
| 2015/0261808 A1 * | 9/2015 | Zhou | G06F 16/2343 707/703 |
| 2016/0357549 A1 | 12/2016 | Buzsaki | |

(Continued)

FOREIGN PATENT DOCUMENTS

CN 102239459 B 4/2015

OTHER PUBLICATIONS

"Patching", E Phelps, P Jackson, 2006, Oracle Applications DBA Field Guide.*

(Continued)

*Primary Examiner* — Wei Y Zhen
*Assistant Examiner* — Amir Soltanzadeh
(74) *Attorney, Agent, or Firm* — Nicholas A. Welling (57) ABSTRACT

A method, system and computer program for analysis of patch impact. The method comprises obtaining first data manipulating statement (DMS) from description of a patch to be installed to a database system; extracting first parse tree and first access path of first DMS; obtaining second DMS from an running database application; extracting second parse tree of second DMS; comparing first parse tree with second parse tree and first access path with second access path; and installing the patch to a database system in response to a determination that first parse tree is a subset of second parse tree and first access path is a subset of second access path.

20 Claims, 6 Drawing Sheets

(56) References Cited

U.S. PATENT DOCUMENTS

2017/0147638 A1\* 5/2017 Park .................... G06F 16/2379
2019/0129811 A1\* 5/2019 Zhu ..................... G06F 16/2455

OTHER PUBLICATIONS

Belknap, et al., "Self-Tuning for SQL Performance in Oracle Database 11g", 2009 IEEE 25th International Conference on Data Engineering, [accessed on Sep. 26, 2019], pp. 1694-1700, Oracle USA, Redwood Shores, CA, USA, Retrieved from the Internet: <https://ieeexplore.ieee.org/abstract/document/4812594>.

Mell et al., "The NIST Definition of Cloud Computing", National Institute of Standards and Technology, Special Publication 800-145, Sep. 2011, 7 pages.

Rosato, et al., "Best Practices for Applying Service Packs, Hottixes and Security Patches", Microsoft, Feb. 20, 2014 [accessed on Sep. 26, 2019], 9 pages, Retrieved from the Internet: <https://msdn.microsoft.com/en-us/library/cc750077.aspx>.

VMware, "Getting Started with Database Patching", VMware vFabric Data Director 2.0, 2012, 9 pages, Palo Alto, CA, USA, Retrieved from the Internet: <https://www.vmware.com/pdf/vfabric-data-director-20-database-patching-guide.pdf>.

Yagoub, et al., "Oracle's SQL Performance Analyzer", Oracle, [accessed on Sep. 26, 2019], 8 pages, Retrieved from the Internet: <http://citeseerx.ist.psu.edu/viewdoc/download?doi=10.1.1.140.6652&rep=rep1&type=pdf>.

\* cited by examiner

ANALYSIS OF PATCH IMPACT ON A RUNNING DATABASE APPLICATION

BACKGROUND

The present disclosure relates to database management systems and, in particular, to a method for analysis of patch impact on running database application.

Applying patches to a database management system (DBMS) periodically is a way to avoid latent defects, such as database abend, incorrect output, performance degrading, during operation of the DBMS. However, the cost and effort for installing patches to the DBMS is sometimes quite high. This is because the databases need to be shut down for the installation. All applications that connect to the DBMS must be suspended or switched to a backup DBMS until the patches are installed. Then the DBMS will restart, and the applications will be resumed or switched back.

SUMMARY

According to one embodiment of the present disclosure, there is provided a computer-implemented method. The method comprises obtaining a first data manipulating statement (DMS) provided in a patch description of a patch to be installed to a database management system (DBMS). The method further comprises extracting a first parse tree and a first access path for the first DMS. The method further comprises obtaining a second DMS from an application running in the DBMS. The method further comprises extracting a second parse tree for the second DMS. The method further comprises comparing the first parse tree with the second parse tree and the first access path with the second access path to determine whether the first parse tree is a subset of the second parse tree and the first access path is a subset of the second access path. The method further comprises installing the patch to the DBMS in response to a determination that the first parse tree is a subset of the second parse tree and the first access path is a subset of the second access path.

According to another embodiment of the present disclosure, there is provided a system comprising one or more processors and a computer-readable memory coupled to the one or more processors. The computer-readable memory comprises instructions for obtaining a first data manipulating statement (DMS) provided in a patch description of a patch to be installed to a database management system (DBMS). The computer-readable memory comprises further instructions for extracting a first parse tree and a first access path for the first DMS. The computer-readable memory comprises further instructions for obtaining a second DMS from an application running in the DBMS. The computer-readable memory comprises further instructions for extracting a second parse tree for the second DMS. The computer-readable memory comprises further instructions for comparing the first parse tree with the second parse tree and the first access path with the second access path to determine whether the first parse tree is a subset of the second parse tree and the first access path is a subset of the second access path. The computer-readable memory comprises further instructions for installing the patch to the DBMS in response to a determination that the first parse tree is a subset of the second parse tree and the first access path is a subset of the second access path.

According to still another embodiment of the present disclosure, there is provided a computer program product. The computer program product comprises a computer readable storage medium having program instructions embodied therewith, the program instructions executable by a processor to cause the processor to perform actions of: obtaining a first data manipulating statement (DMS) provided in a patch description of a patch to be installed to a database management system (DBMS); extracting a first parse tree and a first access path for the first DMS; obtaining a second DMS from an application running in the DBMS; extracting a second parse tree for the second DMS; comparing the first parse tree with the second parse tree and the first access path with the second access path to determine whether the first parse tree is a subset of the second parse tree and the first access path is a subset of the second access path; and installing the patch to the DBMS in response to a determination that the first parse tree is a subset of the second parse tree and the first access path is a subset of the second access path.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
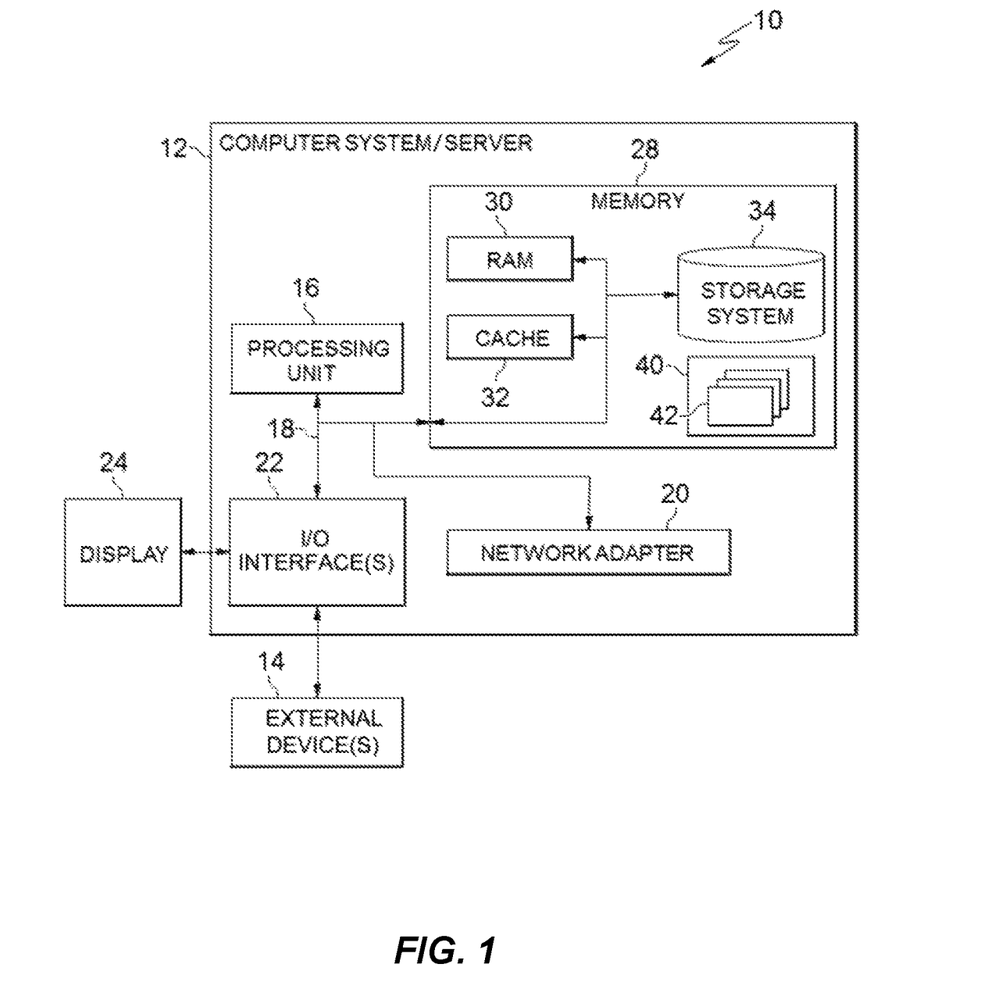
FIG. 1 depicts a cloud computing node according to an embodiment of the present disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
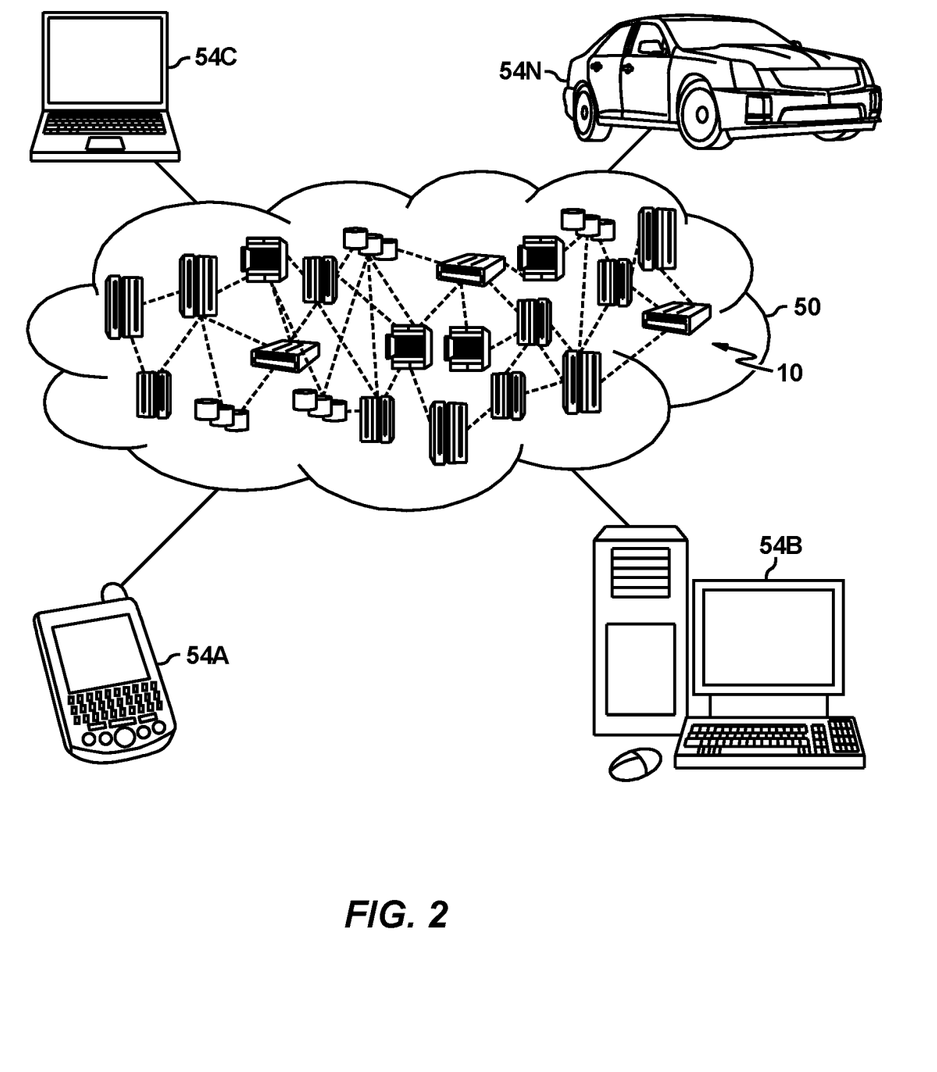
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
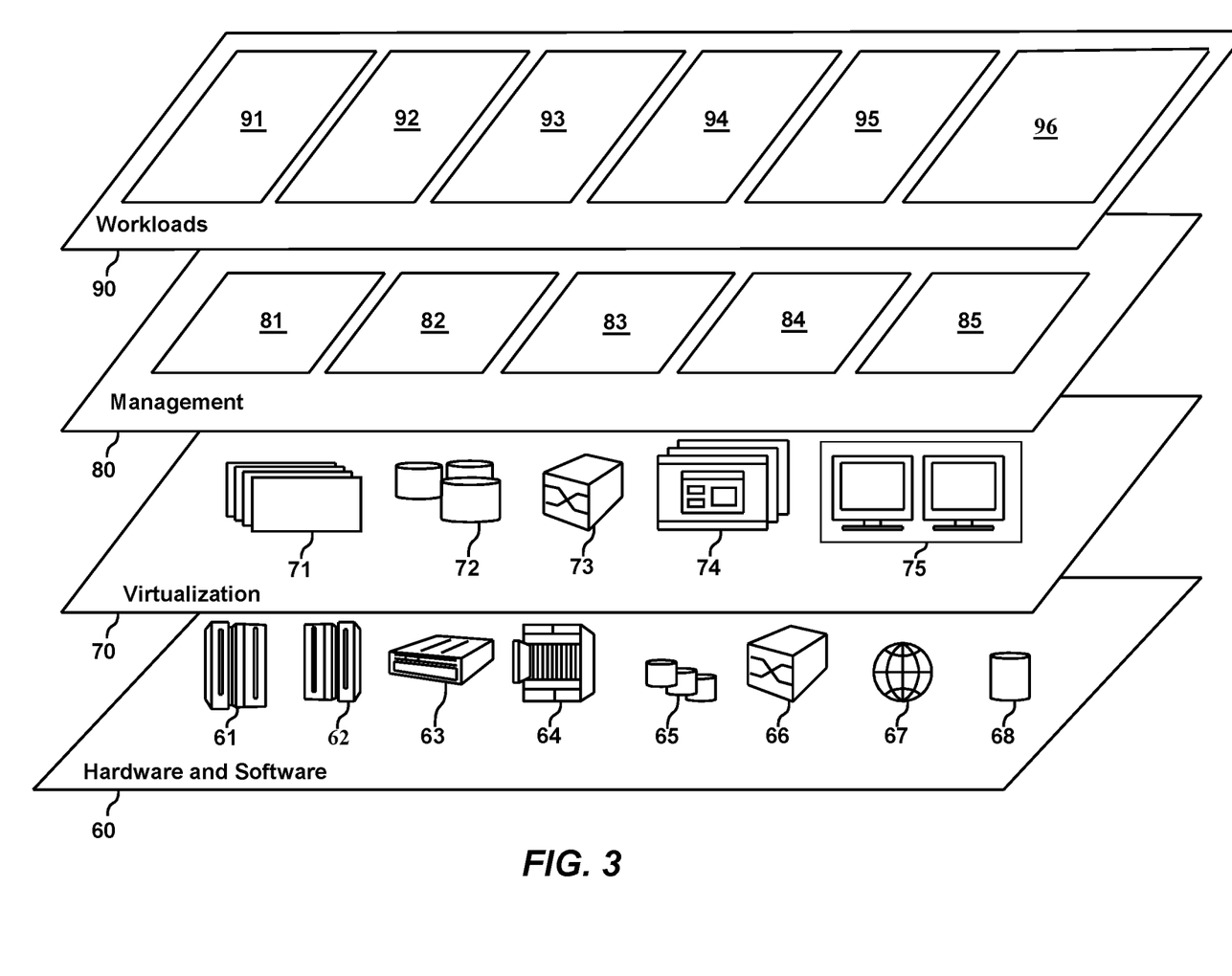
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and analysis of patch impact 96.

With reference now to accompanying drawings, exemplary embodiments of the present invention will be described. The exemplary embodiments are directed to a method, system and computer program product for analysis of patch impact on running database application.

As mentioned, stopping a DBMS to install a patch may have severe business impact if a critical application currently running under the DBMS has to be ceased or cancelled. In fact, sometimes the application may have nothing or little to do with the code/logic to be fixed by a given patch. In that case, there is no need to install the patch immediately. The installation may be postponed until a later time. To properly schedule the installation of the patch, it would be advantageous if the impact of a given patch on the application may be decided in advance.

In the present disclosure, a solution is proposed to determine the similarity between data management statements of an application running under a DBMS and data management statements provided in the description of a patch to be installed to the DBMS. The similarity is examined from both semantic perspective and access path perspective. If any data management statement of the application is determined to be "similar" with a data management statement from the patch description, then the database administer shall consider to timely install the patch to the DBMS.

Figure 4:
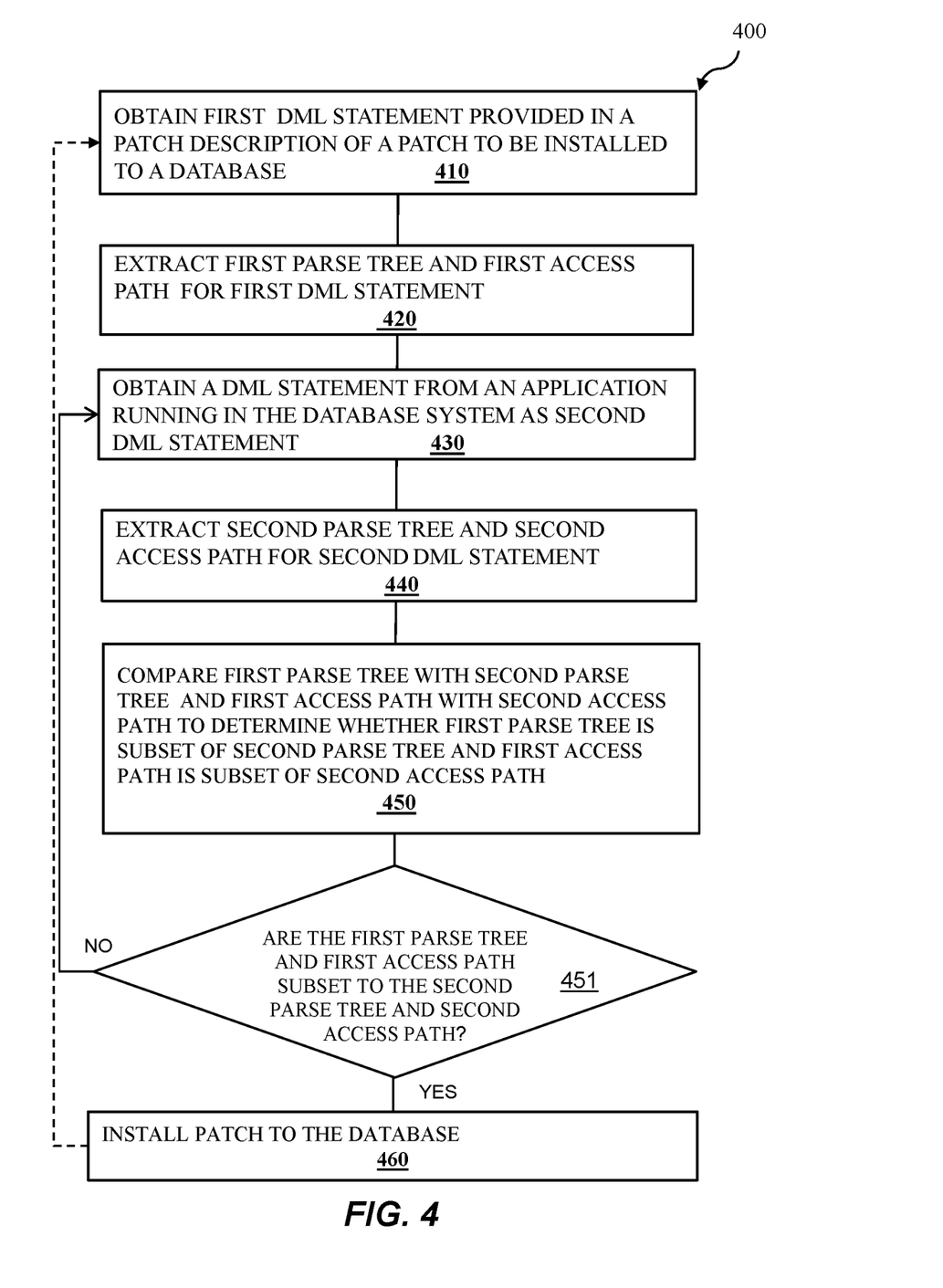
FIG. 4 depicts a flowchart of a method according to an embodiment of the present disclosure.

Turn to FIG. 4, which shows a flowchart of a method 400 according to an embodiment of the present disclosure. The process of method 400 may start when a patch is proposed to be installed to a DBMS. The proposed patch is accompanied by a patch description which provides information including data manipulating statements to illustrate how applications of the DBMS will be affected. The method 400 may be performed repeatedly for each of all of the data manipulating statements.

At step 410, a first data manipulating statement (DMS) provided in a patch description (not shown) of a patch to be installed to a DBMS is obtained.

For ease of description and understanding, Structured Query Language (SQL) database will be used as an example to illustrate embodiments of the present disclosure. SQL is a standardized database language. SQL may also represent a DBMS from which information may be requested, for example, with SQL statements. SQL statements include DDL (Data Definition Language) statements and DML (Data Manipulation Language) statements, among others. DDL statements are used to define the database structure or schema objects, such as tables. DML statements are data manipulating statements used by programmers to implement operations on data within schema objects. Examples of DML statements include SELECT, INSERT, UPDATE, DELETE, MERGE, CALL, EXPLAIN PLAN, LOCK TABLE.

For ease of description, in subsequent paragraphs, DML statements will be used to represent data management statements (DMSs) processed in method 400. An example of a first DML statement obtained from a patch description of a patch (not pictured) to be installed to a DBMS, is as follows:

Statement 1 (First DML Statement)
SELECT Table_Parent.column_1+Table_Column_1
FROM Table_Parent,
   Table_Child
WHERE   Table_Parent.Column_1+Table_Child.Column_1
   AND Table_Child.Column_2 IN ('ABC','DEF',OPQ')

Specifically, the DML statement is a SELECT statement with a FROM clause and a WHERE clause. The SELECT statement references two schema objects, Table_Parent and Table_Child, as indicated by the FROM clause. Definition of the two schema objects will be described further below.

For purpose of simplicity, in subsequent paragraphs, the term "first DML statement" will also be referred to as the "first DML statement" or simply "first statement".

At step 420, by one or more processors, a first parse tree and a first access path are extracted for the first DMS. In the instant case, the first DMS is the first DML statement. Thus, a parse tree for the first DML statement may be extracted as the first parse tree. As is known in the art, a parse tree for a DML statement is an ordered, rooted tree that represents the syntactic structure of the DML statement. Parse trees may be generated by the compiler of the DBMS. Assume that, at step 420, the first parse tree is extracted by using the compiler of the DBMS. The first parse tree will be discussed further below.

For the same reason, an access path for the first DML statement may be extracted as the first access path. In general, an access path for a DML statement defines an ordering of the database objects, such as tables, referenced by the DML statement. It also defines an access method for each table mentioned in the statement. In other words, the access path defines the way in which database objects are accessed by the DML statement. The access path may be extracted from an EXPLAIN TABLE generated for the DML statement by the database optimizer (not shown) of the DBMS. In the instant case, it is assumed that first access path may be extracted from an EXPLAIN TABLE generated by the optimizer. The first access path will be discussed further below.

At step 430, a data manipulating state is obtained from an application running in the DBMS (not shown) as a second DMS.

An example of a second DML statement obtained from a database is as follows:

STATEMENT 2 (Second DML statement)
SELECT District.name || Street.Address || House.House_Name,
   House.Room_Number,
   District.NUM*(CAST(Street.District_Num+House.Room_Number AS DOUBLE))
FROM District,
   Street,
   House
WHERE District.Num=Street.District_Num
   AND Street.Num=House.Street_Num
   AND(District.Location+'3rdRing'
      OR Street.Address LIKE 'beijing%')
   AND House.House_Name IN ('Huanyu", 'Diamond)
   ORDER BY 1,3

According to an embodiment of the present disclosure, the second DMS is of the same type as the first obtained in step 410. Thus, the second DML statement is also a SELECT statement with a FROM clause and a WHERE clause. The second DML statement references three schema objects, namely District, Street and House. Definition of the three schema objects will be described further below.

For purpose of simplicity, in subsequent paragraphs, the term "second DML statement" will also be referred to as the "second DML statement" or simply "second statement".

Then, at step 440, a second parse tree and a second access path for the second DMS is extracted. In the instant case, a parse tree for the second DML statement may be extracted as the second parse tree. Also, the second parse tree may be obtained from the compiler of the DBMS. The second parse tree will be discussed further below.

Similarly, in the instant case, the access path for the second DML statement may be extracted as the second access path, such as from the EXPLAIN TABLE generated for the DML statement by the database optimizer. The second access path will be discussed further below.

After step 440, step 450 is performed. Step 450 involves comparing the first parse tree with the second parse tree and the first access path with the second access path to determine whether the first parse tree is a subset of the second parse tree and the first access path is a subset of the second access path. Details of parse tree comparison and access path comparison will be discussed later further below.

If the first parse tree is a subtree of the second parse tree and the first access path is a subtree of the second access path, step 460 will be performed, as indicated by the "YES" outlet of the determination block 451. At step 460, if it is determined the patch will impact the application due to the similarity of the first DML statement and the second DML statement, the patch will be installed.

However, if the first parse tree is not a subtree of the second parse tree, or the first access path is not a subtree of the second access path, the process will return to step 430, as indicated by the "NO" outlet of block 451, to obtain another DML statement as a second DML statement for the next round of comparison.

In operation, step 410 may be repeated for each of all DML statements in the patch description as the first DML statement. And for each first DML statement, step 430 to step 460 may be repeated for each statement from the application. The purpose is to decide whether the patch has an effect on the application currently running in the DBMS. If it does have an effect, then the patch will be installed to the DBMS.

The general process of method 400 is described above. As shall be appreciated by one skilled in the art, the steps in method 400 may be implemented in various ways.

According to an embodiment of the present disclosure, for effective parse tree comparison and access path comparison, it would be advantageous if database objects referenced by the first statement and the second statement are normalized. To do so, relationship of database objects referenced by the first and second statements may be analyzed.

According to an embodiment of the present disclosure, for a particular schema object of all schema objects referenced by the first DMS, a corresponding schema object referenced by the second DMS is identified. The corresponding schema object shares all elements of the particular schema object in terms of data of same type, associated index and keyword. In the instant case, the first DMS and the second DMS are DML statements.

The following is an example definition of the schema objects referenced by the $1^{st}$ statement 1. Specifically, Statement 3 shows how the DDL (Data Definition Language) statements relate to the schema objects referenced by the Statement 1. For example:
Statement 3
CREATE TABLE Table_Parent
(Column_1 INT,
 Column_2 CHAR(15),
 Column_3 VARCHAR(15));
CREATE INDEX Parent_IDX ON Table_Parent (Column_3);
CREATE TABLE Table_Child
(Column_1 INT(20),
 Column_2 VARCHAR(20))
PARTITION BY SIZE EVERY 200 MB;

As previously mentioned, DDL statements are a type of SQL statement used to define the database structure or schema. The DDL statements in Statement 3 comprise a CREATE statement which defines a schema object Table_Parent, and a CREATE statement which defines a schema object Table_Child. In addition, the DDL statements comprise a CREATE statement defining a schema object Parent_IDX, which is an index associated with Table_Parent.

The following example shows definition of schema objects referenced by the Statement 2 listed above.
Statement 4
CREATE TABLE District
(Num INT,
 Name CHAR(20),
 Location VARCHAR(20));
CREATE TABLE Street
(Num INT,
 Name CHAR(20),
 Address VARCHAR(50)
District_Num INT
PRIMARY KEY(Address));
CREATE INDEX Street_IDX ON Street(Num,Address);
CREATE TABLE House
(Street_Num INT,
 House_ID LONG
 House_Name VARCHAR(30)
 Unit CHAR(10),
 Floor INT,
 Room_Num INT)
PARTITION BY SIZE EVERY 1 GB);

Specifically, this Statement 4 shows a DDL statement relating to the schema objects referenced by the second DML statement. As shown, the DDL statement above comprise CREATE statements, which define schema objects District, Street, and House. In addition, the DDL statements above comprise a CREATE statement defining a schema object Street_IDX, which is an index associated with Street.

In the instant case, for a particular schema object Table_Parent referenced by the first DML statement, a corresponding schema object street referenced by the second DML statement is identified. The corresponding schema object street shares all elements of the particular schema object Table_Parent in terms of data of same type and associated index. Specifically, table street comprises columns Num, Name, and Address respectively corresponding to columns Column_1, Column_2 and Column_3 comprised in table Table_Parent. Num is of the same type (INT) as Column_1. Name is of the same type (CHAR) as Column_2. Address is of the same type (VARCHAR) as Column_3. In addition, street is associated with index Street_IDX which is corresponding to index Parent_IDX that is associated with table Table_Parent.

For another schema object Table_Child referenced by the first DML statement, a corresponding schema object House referenced by the second DML statement is identified. The corresponding schema object street shares all elements of Table_Child in terms of data of same type and keyword. Specifically, table House comprises columns Street_Num and House_Name respectively corresponding to columns Column_1 and Column_2 comprised in table Table_Child. Column_1 is of the same type (INT) as Column_1. House_Name is of the same type (VARCHAR) as Column_2. Address is of the same type (INT) as Column_3. In addition, House comprise a keyword "PARTITION BY" which is also comprised in Table_Child.

In context of the present disclosure, it may be said that schema object Street in Statement 4 is a superset of schema object Table_parent in Statement 3. Schema object House in Statement 4 is a superset of schema object Table_Child in Statement 3. In addition, schema object Street_IDX in Statement 4 is a superset of schema object Parent_IDX in Statement 3. It is to be noted that if there are several such supersets, a least superset will be used to represent the superset for building the superset mapping relationship. A schema object x (not shown) is said to be the least superset of schema object y (not shown) if it is a superset of schema object y with least difference. If, for a schema object referenced by the first DML statement, no superset can be found in schema objects referenced by the second DML statement, processing for the second DML statement will be ended.

According to an embodiment, the first DMS may be normalized by normalizing schema object names and data object names within the schema objects referenced by the first DMS. And the second DMS may be normalized correspondingly by normalizing corresponding schema object names and data object names within the corresponding schema objects referenced by the second DMS.

One skilled in the art shall appreciate that the schema object names and data object names are normalized because they are meaningless in comparing parse trees and in comparing access paths according to embodiment of the present disclosure. The normalization of the schema object names and data object names may be implemented by applying naming rules as follows.

For the first DML statement, a schema object name of, such as a table name, may be normalized by replacing it with a standard table name. The standard table name for the schema object name may be composed of a string "TAB #" plus an order number of its appearance in DDL statement. A data object name, such as table column name, may be normalized by replacing it with a standard data object name. The standard data object name for the data object name may be composed of a string "COL_" plus column data type. A literal value may be replaced with a symbol, such as a question mark "?", for example. Thus, all constants will be ignored in comparing the first DML statement with the second DML statement. The naming rules will also apply to corresponding object names referenced by the second DML statement.

Examples of the naming rules are illustrated below:
Statement 5
CREATE TABLE Table_Parent
(Column_1 INT,→COL_INT
　Column_2 CHAR(15), →COL_CHAR
　Column_3 VARCHAR(15)); →COL_VARCHAR
CREATE INDEX Parent_IDX ON Table_Parent (Column_3); →TAB #1_IDX #1
CREATE TABLE Table_Child→TAB #2
(Column_1 INT(20), →COL_INT
　Column_2 VARCHAR(20))→COL_VARCHAR
PARTITION BY SIZE EVERY 200 MB;
Statement 5 shows standard names for all schema objects and data objects of Statement 3.
　Statement 6
　CREATE TABLE District
(Num INT,
　Name CHAR(20),
　Location VARCHAR(20));
CREATE TABLE Street→TAB #1
(Num INT,→COL_INT
　Name CHAR(20), →COL_CHAR
　Address VARCHAR(50)→COL_VARCHAR
District_Num INT
PRIMARY KEY(Address));
CREATE INDEX Street_IDX ON Street(Num, Address); →TAB #1_IDX #1
CREATE TABLE House
(Street_Num INT,→COL_INT
　House_ID LONG
　House_Name VARCHAR(30)→COL_VARCHAR
　Unit CHAR(10),
　Floor INT,
　Room_Num INT)
PARTITION BY SIZE EVERY 1 GB);

Statement 6 shows standard names for schema objects and data objects that correspond to Statement 4. Specifically, the standard names for schema objects Table_Parent 5, Table_Child and Parent_IDX are TAB #1, TAB #2 and TAB #1_IDX #1, respectively. The standard names for the corresponding schema objects Street, House and Street_IDX are TAB #1, TAB #2 and TAB #1_IDX #1, respectively.

The standard names for data objects Column_1, Column_2 and Column_3 within table Table_Parent are COL_INT, COL_CHAR, and COL_VARCHAR, respectively. The standard names for the corresponding data objects Num, Name, and Address within corresponding table Street are COL_INT, COL_CHAR, and COL_VARCHAR, respectively.

The standard names for data objects Column_1 and Column_2 within table Table_Child are COL_INT and COL_VARCHAR, respectively. The standard names for the corresponding data objects Street_Num and House_Name within corresponding table House are COL_INT 84b and COL_VARCHAR, respectively.

With the standard names defined for the schema objects and data objects, the first DML statement may be normalized by replacing its schema object names and data object names with the defined standard names as follows:
　Statement 7
　SELECT　Table_Parent.Column_1+
　　Table_Child.Column_1→TAB #1.COL_INT+TAB #2.COL_INT
　FROM Table_parent,→TAB #1,
　　Table_child→TAB #2
　WHERE
　　Table_Parent.Column_1=Table_Child.Column_1→TAB #1.COL_INT=TAB #2.COL_INT
　　AND Table_Child.Column_2 IN ('ABD','DEF', 'OPQ')→TAB #2.COL_VARCHAR IN (?,?,?)

After normalization, the first DML statement as shown in Statement 1 is represented by the first normalized DML statement as shown in Statement 7. It is noted that, after normalization, constants 'ABD', 'DEF' and 'OPQ' in the first DML statement are replaced with a symbol "?" to represent a constant value. As mentioned previously, constants will be ignored in comparing the first DML statement with the second DML statement.

Correspondingly, the second DML Statement 2 may be normalized by replacing its corresponding schema object names and data object names with the predefined standard names as follows:

STATEMENT 8
SELECT District.name || Street. Address || House.House_Name,
　House.Room_number, → TAB#1.COL_VARCHAR ||
TAB#2.COL_VARCHAR,TAB#2.COL_INT,
　District.Num * (CAST(Street.District_Num+House.Room_Number AS DOUBLE))→ (CAST(TAB#1.COL_INT+TAB#2.COL_VARCHAR AS DOUBLE))
FROM District,
　Street, → TAB#1
　House → TAB#2
WHERE District.Num = Street.District_Num
　AND Street.Num = House.Street Num →TAB#1.COL INT = TAB#2.COL_INT
　AND ( District.Location ='3rdRing'
　　OR Street.Address LIKE 'Beijing%') → TAB#1.COL_VARCHAR LIKE?)
　AND House.House_Name IN ('Huanyu', 'Diamond')
TAB#2.COL_VARCHAR IN ?, ?)
　　ORDER BY 1,3

After normalization, the second DML Statement 2 is represented by the first normalized DML Statement 8 shown above. Similarly, after normalization, the constants 'Huanyu' and 'Diamond' in the second DML statement are replaced with a symbol "?".

Returning to FIG. 4, according to an embodiment of the present disclosure, comparing the first parse tree with the second parse tree at step 450 comprises comparing the first normalized parse tree with the second normalized parse tree. The first normalized parse tree may be obtained by normalizing its schema object names and data object names with the defined standard names and the second normalized parse tree may be obtained by normalizing its corresponding schema object names and data object names with the defined standard names. It is to be note that in implementation, the normalization may be done after the parse tree is extracted. It may also be performed by extracting the parse tree from the first normalized DML as exhibited in Statement 7 and the second normalized DML as exhibited in Statement 8. The first normalized parse tree and the second normalized parse tree will be discussed below with respect to FIG. 5 and FIG. 6.

Similarly, according to an embodiment of the present disclosure, comparing the first access path with the second access path at step 450 comprises comparing the first normalized access path with the second normalized access path. The first normalized access path may be obtained by normalizing its schema object names with the defined standard names, and the second normalized access path may be obtained by normalizing its corresponding schema object names with the defined standard names. It is to be noted that in implementation, the normalization may be done after the access path is extracted. It may also be performed by extracting the access path from the first normalized DML statement and the second normalized DML statement. The first normalized access path and the second normalized access path will be discussed below.

Now turn to FIG. 5 and FIG. 6, step 450 of parse tree comparison will be discussed with reference to FIG. 5 and FIG. 6. According to an embodiment of the present disclosure, at step 450, the first parse tree and the second parse tree may be compared clause by clause.

Figure 5:
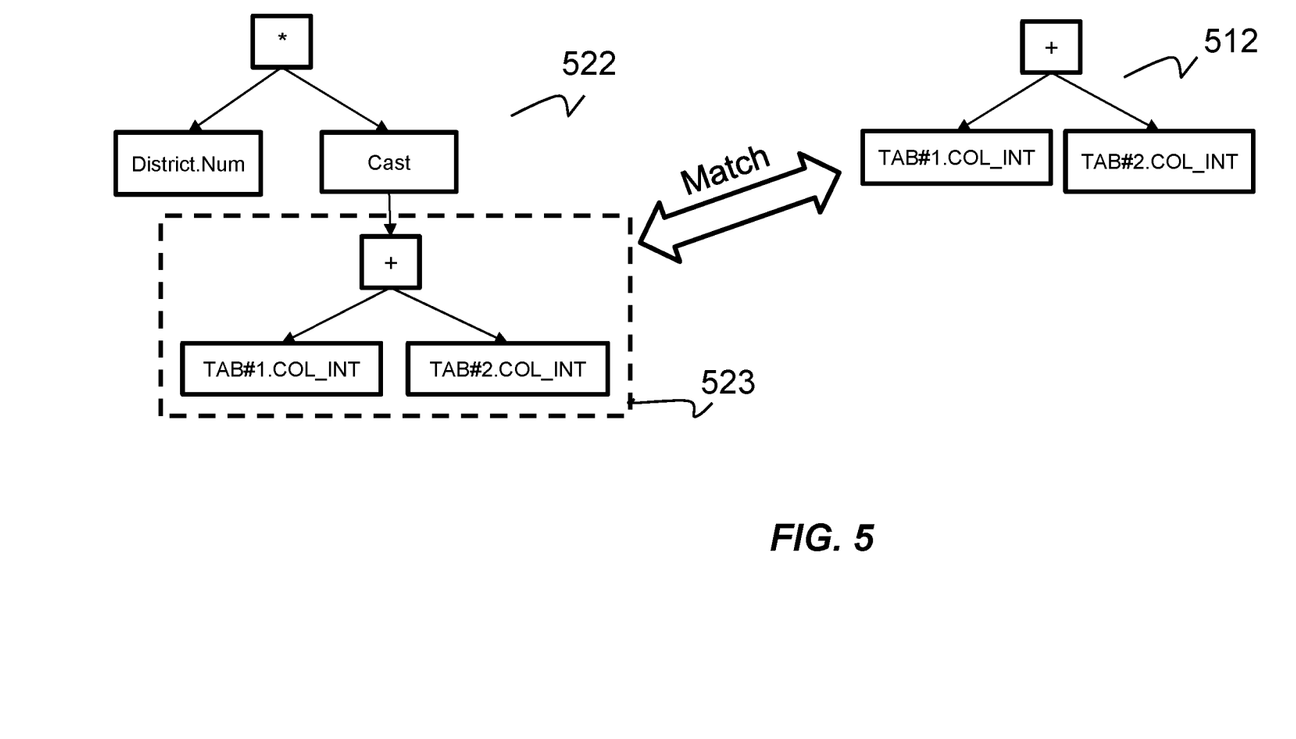
FIG. 5 depicts an expression tree structure for the first normalized DML statement and an expression tree structure for the second normalized DML statement according to an embodiment of the present disclosure.

FIG. 5 depicts a subtree of a parse tree (not shown) for the first normalized DML Statement 7 above and a subtree 522 of a parse tree (not shown) for the second normalized DML Statement 8. Specifically, subtree 512 is an expression tree structure representing the expression:

Statement 9
TAB #1.COL_INT+TAB #2.COL_INT in the SELECT clause of the first normalized DML Statement 7. Subtree 522 is an expression tree structure representing the expression Statement 10
District.Num*(CAST (TAB #1.COL_INT+TAB #2.COL_ INT AS DOUBLE))

in the SELECT clause of the second normalized DML Statement 8. As can been seen, expression tree structure 522 includes a subtree 523 which matches with expression tree structure 512. In other words, the expression tree structure 512 is deemed as a subtree of expression tree structure 522. This means items in the Statement 9 are derivable from Statement 10.

Figure 6:
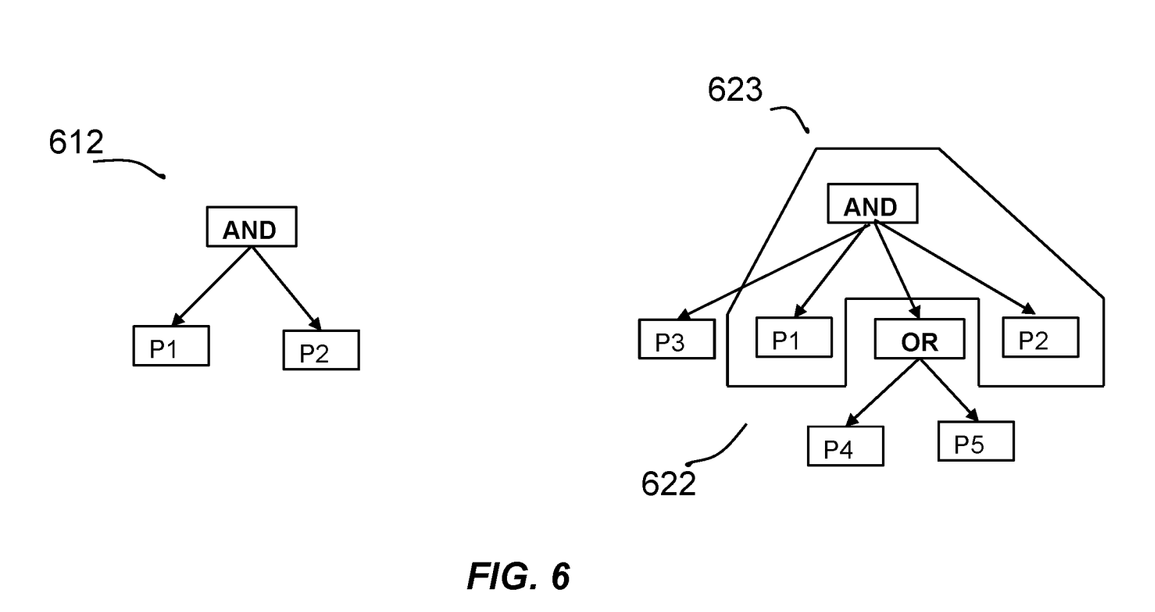
FIG. 6 depicts a predicate tree structure for the first normalized DML statement and a predicate tree structure for the second normalized DML statement according to an embodiment of the present disclosure.

FIG. 6 depicts a subtree 612 of the parse tree for the first normalized DML Statement 8 and a subtree 622 of the parse tree for the second normalized DML Statement 9. Specifically, subtree 612 is a predicate tree structure representing the predicates Statement 11
WHERE TAB #1.COL_INT=TAB #2.COL_INT
   AND TAB #2.COL_VARCHAR IN (?,?,?)

in the WHERE clause of the first Statement 1, and subtree 622 is a predicate tree structure representing the predicates Statement 12
WHERE District.Num=TAB #1.COL_INT
   AND TAB #1.COL_INT=TAB #2.COL_INT
   AND (District.Location='3rdRing'
      OR TAB #1.COL_VARCHAR
   LIKE ?)
      AND TAB #2.COL_VARCHAR IN ?, ?)

in the SELECT clause of the second normalized DML Statement 8. Generally, a predicate tree structure is a tree in which a non-leaf node represents operator keyword AND/OR and a leaf node represents an atomic predicate or operand. For example, node represents an atomic predicate TAB #1.COL_INT=TAB #2.COL_INT. As can been seen, predicate tree structure 622 includes a subtree 623 which matches with predicate tree structure 612. Thus, predicate tree structure 612 is deemed as a subtree of the predicate tree structure 622. This means predicates in the WHERE clause of the first normalized DML Statement 11 is derivable from predicates in the WHERE clause of the second normalized DML Statement 12.

The part of parse tree for the FROM clause, which comprises TAB #1 and TAB #2, of the first normalized DML Statement 7 and the part of parse tree for the FROM clause, which comprises District, TAB #1 and TAB #2, of the second normalized DML Statement 8 are not shown. Obviously, the part of parse tree for the FROM clause of the first normalized DML Statement 7 is a subset of the part of parse tree for the FROM clause of the second normalized DML Statement 8, because <TAB #1 and TAB #2> is a subset of <District, TAB #1 and TAB #2>.

Based on the parse tree comparison described in the above, it may be determined, at step 450, that the first parse tree for the first DMS is a subset of the second parse tree for the second DMS.

The following example depicts an execution plan of first DML Statement 1.

| | | | | | | | | | | |
|---|---|---|---|---|---|---|---|---|---|---|
| | | | | | STATEMENT 13 | | | | | |
| PLAN-NO | METHOD | TNAME | ACCESS-TYPE | MATCH-COLS | ACCESS-NAME | INDEX-ONLY | SORTN_UNIQ | SORTN_JOIN | QBLOCK_TYPE | TABLE_TYPE |
| 1 | Leading | Table_Child | R-Scan | 0 | | N | N | N | SELECT | T |
| 2 | NLJ | Table_Parent | Index access | 1 | Parent_IDX | Y | N | N | SELECT | T |

Statement 13 contains information of access path of the first DML statement. From the execution plan, information on access path may be extracted. The information includes an ordering of the schema objects, Table_child and Table_Parent, as shown in column TNAME of the plan table Statement 13, referenced by first DML Statement 1 and an access method (using index Parent_IDX) as shown in column ACCESSNAME for each schema object mentioned in first DML Statement 1. The following example depicts an execution plan of the second DML Statement 2.

correspondence of <TAB #2,TAB #1> and <TAB #2, TAB #1> (within <TAB #2, TAB #1, District>). Correspondingly, object name TAB #1_IDX #1 in column ACCESSNAME of Statement 16, which is associated with TAB #1 in column ACCESSNAME of Statement 15, is the same as, thus a subset of, object names TAB #1_IDX #1 in column ACCESSNAME of Statement 16 associated with TAB #1 in column ACCESSNAME of Statement 15, which is. Thus, it may be determined that the first access path is a subset of the second access path.

STATEMENT 14

| PLAN-NO | METHOD | TNAME | ACCESS-TYPE | MATCH-COLS | ACCESS-NAME | INDEX-ONLY | SORTN_UNIQ | SORTN_JOIN | QBLOCK_TYPE | TABLE_TYPE |
|---|---|---|---|---|---|---|---|---|---|---|
| 1 | Leading | House | R-Scan | 0 | | N | N | N | SELECT | T |
| 2 | NLJ | Street | Index access | 1 | Street_IDX | Y | N | Y | SELECT | T |
| 3 | NLJ | District | R-Scan | 0 | | N | N | Y | SELECT | T |

Execution plan 1120A contains information of access path of the second DML statement. Information on access path in execution plan 1120A includes an ordering of the schema objects, House, Street and District as shown in column TNAME, referenced by second DML statement and an access method (using index Street_IDX) in the ACCESSNAME column for each schema object mentioned in second DML Statement 2. The following Statement 15 is the same as Statement 13 except that the schema object names Table_child, Table_Parent and Parent_IDX are normalized to TAB #2, TAB #1 and TAB #1_IDX #1.

Embodiments of the present disclosure have been described in the above. It should be noted that the processing of the method for analysis of patch impact on running database application according to embodiments of this disclosure could be implemented by computer system/server 12 of FIG. 1.

The present invention may be a system, a method, and/or a computer program product at any possible technical detail level of integration. The computer program product may

STATEMENT 15

| PLAN-NO | METHOD | TNAME | ACCESS-TYPE | MATCH-COLS | ACCESS-NAME | INDEX-ONLY | SORTN_UNIQ | SORTN_JOIN | QBLOCK_TYPE | TABLE_TYPE |
|---|---|---|---|---|---|---|---|---|---|---|
| 1 | Leading | TAB#2 | R-Scan | 0 | | N | N | N | SELECT | T |
| 2 | NLJ | TAB#1 | Index access | 1 | TAB#1_IDX#1 | Y | N | N | SELECT | T |

Similarly, the following Statement 16 is the same as Statement 14 except that the object names House, Street and Street_IDX are normalized to TAB #2, TAB #1 and TAB #1_IDX #1.

include a computer readable storage medium (or media) having computer readable program instructions thereon for causing a processor to carry out aspects of the present invention.

STATEMENT 16

| PLAN-NO | METHOD | TNAME | ACCESS-TYPE | MATCH-COLS | ACCESS-NAME | INDEX-ONLY | SORTN_UNIQ | SORTN_JOIN | QBLOCK_TYPE | TABLE_TYPE |
|---|---|---|---|---|---|---|---|---|---|---|
| 1 | Leading | TAB#2 | R-Scan | 0 | | N | N | N | SELECT | T |
| 2 | NLJ | TAB#1 | Index access | 1 | TAB#1_IDX#1 | Y | N | Y | SELECT | T |
| 3 | NLJ | District | R-Scan | 0 | | N | N | Y | SELECT | T |

In performing access path comparison at step 450, the first normalized access path defined by information in the TNAME and ACCESSNAME columns of Statement 16 may be compared to the second normalized access path defined by information in column TNAME and ACCESSNAME column of Statement 15. In the instant case, object names <TAB #2, TAB #1> in column TNAME of Statement 15 is a subset of object names <TAB #2, TAB #1, District> in column TNAME of Statement 16 because of the orderly The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining whether to install a patch based on patch analysis of a running database, the computer-implemented method comprising:

obtaining, by one or more processors, a first data manipulating statement (DMS) provided in a patch description of a patch to be installed to a database management system (DBMS);
extracting, by the one or more processors, a first parse tree and a first access path from the first DMS;
obtaining, by the one or more processors, a second DMS from an application running in the DBMS;
extracting, by the one or more processors, a second parse tree and a second access path for the second DMS;
comparing, by the one or more processors, the first parse tree with the second parse tree and the first access path with the second access path to determine whether the first parse tree is a subset of the second parse tree and the first access path is a subset of the second access path; and
installing, by the one or more processors, the patch to the DBMS in response to a determination that the first parse tree is a subset of the second parse tree and the first access path is a subset of the second access path.

2. The computer-implemented method of claim 1, wherein the second DMS is of the same type as the first DMS, and wherein for a particular schema object of all schema objects referenced by the first DMS, there is a corresponding schema object referenced by the second DMS, the corresponding schema object being a superset of the particular schema object sharing all elements of the particular schema object in terms of data of same type, associated index and keyword.

3. The computer-implemented method of claim 2, further comprising:
normalizing, by the one or more processors, schema object names and data object names within the schema objects referenced by the first DMS; and
normalizing, by the one or more processors, corresponding schema object names and data object names within the corresponding schema objects referenced by the second DMS.

4. The computer-implemented method of claim 3, further comprising:
normalizing, by the one or more processors, the first parse tree by normalizing schema object names and data object names within the schema objects referenced by the first parse tree; and
normalizing, by the one or more processors, the second parse tree correspondingly by normalizing corresponding schema object names and data object names within the corresponding schema objects referenced by the second parse tree.

5. The computer-implemented method of claim 3, further comprising:
normalizing, by the one or more processors, the first access path by normalizing schema object names referenced by the first access path; and
normalizing, by the one or more processors, the second access path correspondingly by normalizing corresponding schema object names referenced by the second access path.

6. The computer-implemented method of claim 4, wherein comparing the first parse tree with the second parse tree comprises comparing the first normalized parse tree with the second normalized parse tree.

7. The computer-implemented method of claim 5, wherein comparing the first access path with the second access path comprises comparing the first normalized access path with the second normalized access path.

8. A computer system for determining whether to install a patch based on patch analysis of a running database, the computer system comprising: one or more computer processors;
one or more non-transitory computer readable storage media; program instructions stored on the one or more non-transitory computer readable storage media for execution by at least one of the one or more computer processors, the program instructions comprising;
program instructions to obtain a first data manipulating statement (DMS) provided in a patch description of a patch to be installed to a database management system (DBMS);
program instructions to extract a first parse tree and a first access path from the first DMS;
program instructions to obtain a second DMS from an application running in the DBMS;
program instructions to extract a second parse tree and a second access path for the second DMS;
program instructions to compare the first parse tree with the second parse tree and the first access path with the second access path to determine whether the first parse tree is a subset of the second parse tree and the first access path is a subset of the second access path; and
program instructions to install the patch to the DBMS in response to a determination that the first parse tree is a subset of the second parse tree and the first access path is a subset of the second access path.

9. The computer system of claim 8, wherein the second DMS is of the same type as the first DMS, and wherein for a particular schema object of all schema objects referenced by the first DMS, there is a corresponding schema object referenced by the second DMS, the corresponding schema object being a superset of the particular schema object sharing all elements of the particular schema object in terms of data of same type, associated index and keyword.

10. The computer system of claim 9, further comprising;
program instructions to normalize schema object names and data object names within the schema objects referenced by the first DMS; and
program instructions to normalize, by one or more processors, corresponding schema object names and data object names within the corresponding schema objects referenced by the second DMS.

11. The computer system of claim 10, further comprising:
program instructions to normalize the first parse tree by normalizing schema object names and data object names within the schema objects referenced by the first parse tree; and
program instructions to normalize the second parse tree correspondingly by normalizing corresponding schema object names and data object names within the corresponding schema objects referenced by the second parse tree.

12. The computer system of claim 10, further comprising:
program instructions to normalize the first access path by normalizing schema object names referenced by the first access path; and
program instructions to normalize the second access path correspondingly by normalizing corresponding schema object names referenced by the second access path.

13. The computer system of claim 11, wherein comparing the first parse tree with the second parse tree comprises comparing the first normalized parse tree with the second normalized parse tree.

14. The computer system of claim 12, wherein comparing the first access path with the second access path comprises comparing the first normalized access path with the second normalized access path.

15. A computer program product for determining whether to install a patch based on patch analysis of a running database, the computer program product comprising:
one or more non-transitory computer readable storage media and program instructions stored on the one or more non-transitory computer readable storage media, the program instructions comprising:
program instructions to obtain a first data manipulating statement (DMS) provided in a patch description of a patch to be installed to a database management system (DBMS);
program instructions to extract a first parse tree and a first access path from the first DMS;
program instructions to obtain a second DMS from an application running in the DBMS;
program instructions to extract a second parse tree and a second access path for the second DMS;
program instructions to compare the first parse tree with the second parse tree and the first access path with the second access path to determine whether the first parse tree is a subset of the second parse tree and the first access path is a subset of the second access path; and
program instructions to install the patch to the DBMS in response to a determination that the first parse tree is a subset of the second parse tree and the first access path is a subset of the second access path.

16. The computer program product of claim 15, wherein the second DMS is of the same type as the first DMS, and wherein for a particular schema object of all schema objects referenced by the first DMS, there is a corresponding schema object referenced by the second DMS, the corresponding schema object being a superset of the particular schema object sharing all elements of the particular schema object in terms of data of same type, associated index and keyword.

17. The computer program product of claim 16, further comprising:
program instructions to normalize schema object names and data object names within the schema objects referenced by the first DMS; and
program instructions to normalize, by one or more processors, corresponding schema object names and data object names within the corresponding schema objects referenced by the second DMS.

18. The computer program product of claim 17, further comprising:
program instructions to normalize the first parse tree by normalizing schema object names and data object names within the schema objects referenced by the first parse tree;
program instructions to normalize the second parse tree correspondingly by normalizing corresponding schema object names and data object names within the corresponding schema objects referenced by the second parse tree;
normalizing the first access path by normalizing schema object names referenced by the first access path; and
program instructions to normalize the second access path correspondingly by normalizing corresponding schema object names referenced by the second access path.

19. The computer program product of claim 18, wherein comparing the first parse tree with the second parse tree comprises comparing the first normalized parse tree with the second normalized parse tree.

20. The computer program product of claim 18, wherein comparing the first access path with the second access path comprises comparing the first normalized access path with the second normalized access path.

* * * * *